(12) United States Patent
Suzuki et al.

(10) Patent No.: US 10,520,017 B2
(45) Date of Patent: Dec. 31, 2019

(54) TAPERED ROLLER BEARING

(71) Applicant: JTEKT CORPORATION, Osaka-shi, Osaka (JP)

(72) Inventors: Akiyuki Suzuki, Nagoya (JP);
Hiroyuki Ohshima, Kashihara (JP);
Youzou Taniguchi, Kashiwara (JP)

(73) Assignee: JTEKT CORPORATION, Osaka (JP)

( * ) Notice: Subject to any disclaimer, the term of this patent is extended or adjusted under 35 U.S.C. 154(b) by 0 days.

(21) Appl. No.: 16/227,620

(22) Filed: Dec. 20, 2018

(65) Prior Publication Data

US 2019/0195277 A1    Jun. 27, 2019

(30) Foreign Application Priority Data

Dec. 26, 2017   (JP) .................................. 2017-249625
Oct. 9, 2018    (JP) .................................. 2018-190992

(51) Int. Cl.
*F16C 33/46*      (2006.01)
*F16C 19/36*      (2006.01)

(52) U.S. Cl.
CPC .......... *F16C 19/364* (2013.01); *F16C 33/467* (2013.01)

(58) Field of Classification Search
CPC ... F16C 33/4605; F16C 33/467; F16C 19/364
See application file for complete search history.

(56) References Cited

U.S. PATENT DOCUMENTS

| 2008/0219606 | A1 | 9/2008 | Sada et al. | |
| 2012/0263405 | A1* | 10/2012 | Mizuki | F16C 33/4635 |
| | | | | 384/473 |
| 2015/0275974 | A1* | 10/2015 | Suzuki | F16C 19/364 |
| | | | | 384/470 |
| 2016/0281774 | A1* | 9/2016 | Nagai | F16C 19/364 |
| 2018/0119735 | A1* | 5/2018 | Hayashi | F16C 19/364 |

FOREIGN PATENT DOCUMENTS

| DE | 102013211906 | * 12/2014 | |
| JP | 2008-223891 A | 9/2008 | |
| JP | 2012141050 A | * 7/2012 | ......... F16C 33/6651 |

* cited by examiner

*Primary Examiner* — Alan B Waits
(74) *Attorney, Agent, or Firm* — Oliff PLC

(57) ABSTRACT

A tapered roller bearing includes an inner ring including, on its outer circumferential surface, an inner raceway surface and including, on an end portion on a second axial side, a cone back face rib portion protruding radially outward, an outer ring including, on its inner circumferential surface, an outer raceway surface, a plurality of tapered rollers disposed between the inner ring and the outer ring, and an annular cage that retains the plurality of tapered rollers spaced from each other in a circumferential direction. The cage includes a small-diameter annular portion, a large-diameter annular portion located on the second axial side relative to the tapered rollers and the outer ring, and a plurality of cage bar portions. The large-diameter annular portion has an oil pocket having a first aperture that is open radially inward and a second aperture that is open toward the outer raceway surface.

10 Claims, 14 Drawing Sheets

AXIAL DIRECTION
FIRST SIDE ←――――→ SECOND SIDE

AXIAL DIRECTION
FIRST SIDE ←⎯→ SECOND SIDE

AXIAL DIRECTION
FIRST SIDE ←——→ SECOND SIDE

AXIAL DIRECTION
FIRST SIDE ←⎯⎯→ SECOND SIDE

AXIAL DIRECTION
FIRST SIDE ←——→ SECOND SIDE

TAPERED ROLLER BEARING

INCORPORATION BY REFERENCE

The disclosure of Japanese Patent Application No. 2017-249625 filed Dec. 26, 2017 and No. 2018-190992 filed Oct. 9, 2018 including the specification, drawings and abstract, is incorporated herein by reference in its entirety.

BACKGROUND OF THE INVENTION

1. Field of the Invention

The invention relates to a tapered roller bearing.

2. Description of Related Art

As illustrated in FIG. 14, a tapered roller bearing includes an inner ring 91, an outer ring 92, a plurality of tapered rollers 93, and an annular cage 94. The tapered rollers 93 are disposed between the inner ring 91 and the outer ring 92. The cage 94 retains the tapered rollers 93 such that the tapered rollers 93 are spaced from each other in a circumferential direction. The inner ring 91 includes an inner raceway surface 95 that expands in diameter from a first side in an axial direction (hereinafter referred to as the "first axial side") toward a second side, which is opposite to the first side, in the axial direction (hereinafter referred to as the "second axial side"). The inner ring 91 also includes, on its end portion on the second axial side, a cone back face rib portion (hereinafter referred to as a "large rib portion") 96 that protrudes outward in a radial direction. The outer ring 92 includes an outer raceway surface 97 that expands in diameter from the first axial side toward the second axial side.

When the inner ring 91 rotates, each of the tapered rollers 93 revolves while rotating along the inner raceway surface 95 and the outer raceway surface 97. At this time, a roller large end face 98 included in the tapered roller 93 on the second axial side makes sliding contact with the large rib portion 96. Accordingly, if shortage of lubricating oil occurs between the roller large end face 98 and the large rib portion 96, seizure may occur. Japanese Patent Application Publication No. 2008-223891 (JP 2008-223891 A) discloses a tapered roller bearing, in which a member 100 for providing an oil pocket 99 (indicated by a long dashed double-short dashed line in FIG. 14) is attached to the second axial side of the outer ring 92.

According to the tapered roller bearing described in JP 2008-223891 A, lubricating oil in the oil pocket 99 can be used for lubrication between the roller large end face 98 and the large rib portion 96. This allows reduction of seizure between the roller large end face 98 and the large rib portion 96.

Further development of such a tapered roller bearing capable of reducing occurrence of shortage of the lubricating oil at sliding contact portions (sliding portions) between the roller large end faces of the tapered rollers and the large rib portion of the inner ring is underway.

SUMMARY OF THE INVENTION

An object of the invention is to provide a tapered roller bearing capable of, using a novel technical feature, supplying lubricating oil to spaces between roller large end faces of tapered rollers and a cone back face rib portion of an inner ring.

A tapered roller bearing according to an aspect of the invention includes an inner ring including, on its outer circumferential surface, an inner raceway surface that expands in diameter from a first side in an axial direction toward a second side, which is opposite to the first side, in the axial direction and including, on an end portion on the second side in the axial direction of the inner ring, a cone back face rib portion protruding outward in a radial direction, an outer ring including, on its inner circumferential surface, an outer raceway surface that expands in diameter from the first side in the axial direction toward the second side in the axial direction, a plurality of tapered rollers disposed between the inner ring and the outer ring, and an annular cage that retains the plurality of tapered rollers such that the tapered rollers are spaced from each other in a circumferential direction. The cage includes a small-diameter annular portion located on the first side relative to the tapered roller in the axial direction, a large-diameter annular portion located on the second side relative to the tapered roller and the outer ring in the axial direction, and a plurality of cage bar portions that connects the small-diameter annular portion and the large-diameter annular portion. Spaces between each circumferentially-adjacent pair of the plurality of cage bar portions in an area between the small-diameter annular portion and the large-diameter annular portion serve as cage pockets for accommodating the tapered rollers. The large-diameter annular portion has an oil pocket having a first aperture that is open radially inward and a second aperture that is open toward the outer raceway surface.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
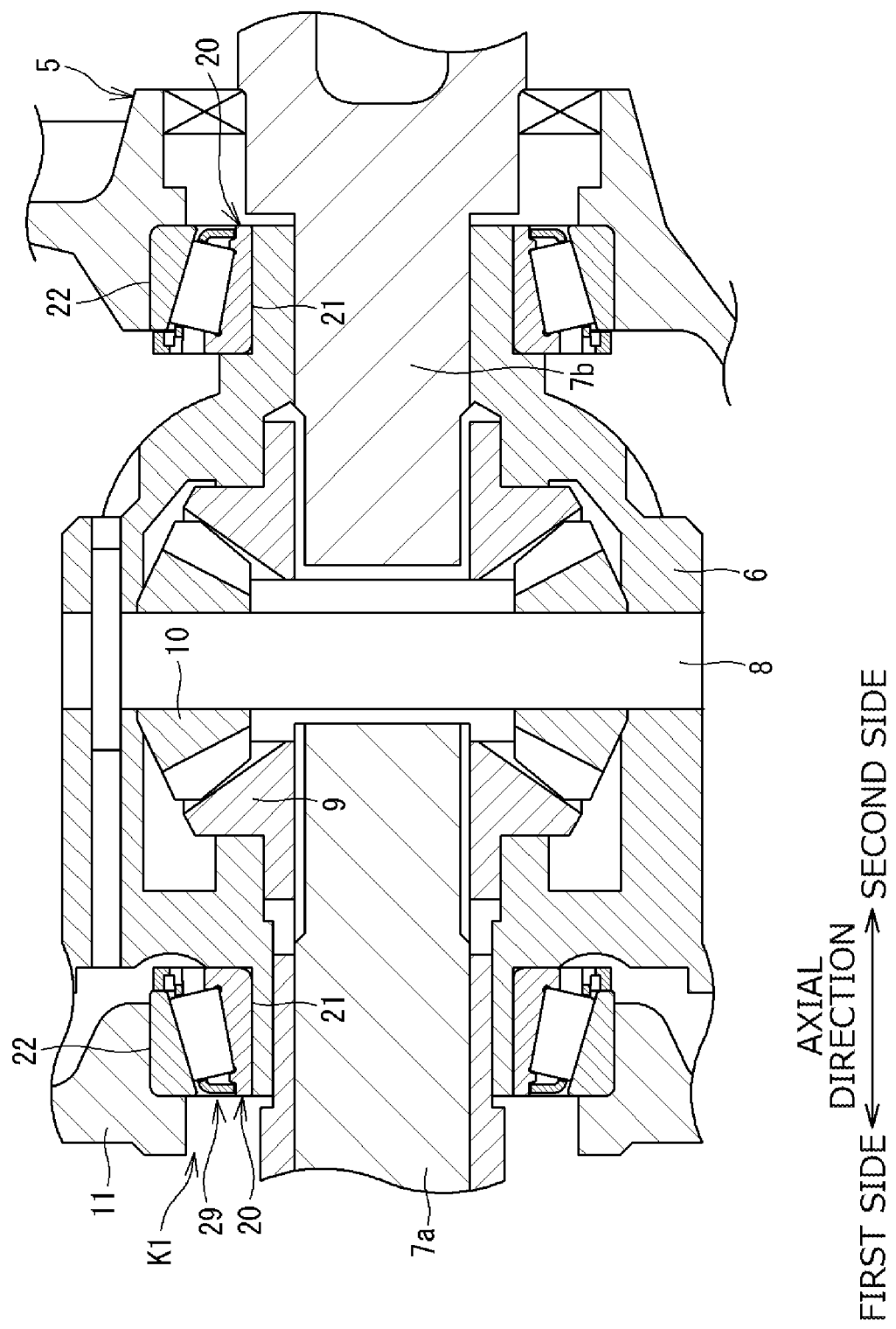
FIG. 1 is a sectional view illustrating an example of a gear mechanism including tapered roller bearings according to a first embodiment of the invention.
Figure 2:
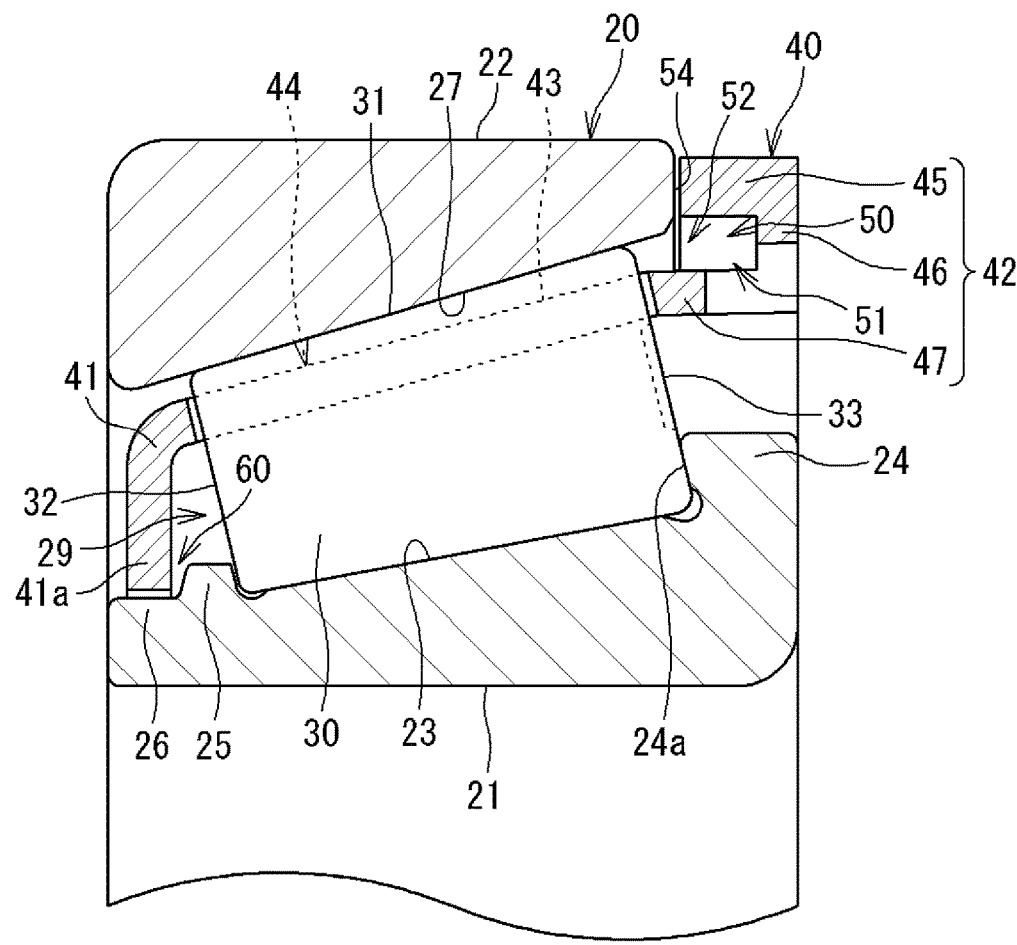
FIG. 2 is a sectional view of the tapered roller bearing.

FIG. 1 is a sectional view illustrating an example of a gear mechanism including tapered roller bearings according a first embodiment of the invention. The gear mechanism illustrated in FIG. 1 is a differential gear mechanism 5 to be mounted on an automobile. The differential gear mechanism 5 (hereinafter simply referred to as the "gear mechanism 5") includes a case (differential case) 6, rotary shafts (drive shafts) 7a and 7b, a pin 8, a side gear 9, and a pinion gear 10. The rotary shafts 7a and 7b project from the case 6. The pin 8, the side gear 9, and the pinion gear 10 are disposed inside the case 6. The gear mechanism 5 further includes tapered roller bearings 20 that support the case 6 relative to an overall housing 11. Inner rings 21 included in the tapered roller bearings 20 are attached to the case 6. Outer rings 22 included in the tapered roller bearings 20 are attached to the overall housing 11. Lubricating oil is stored in the overall housing 11. The lubricating oil is used for lubrication of sliding surfaces of various gears and portions in the tapered roller bearings 20 and the case 6. Although not illustrated, a groove (helical groove) is defined in an outer circumferential surface of each of the rotary shafts 7a and 7b. When the rotary shafts 7a and 7b rotate, the lubricating oil in the overall housing 11, excluding lubricating oil in the case 6, is forced to flow through the groove and supplied into the case 6. The tapered roller bearing 20 on the left side in FIG. 1 and the tapered roller bearing 20 on the right side are identical in structure. FIG. 2 is a sectional view of the tapered roller bearing 20 on the left side in FIG. 1.

Referring to FIG. 2, the tapered roller bearing 20 includes the inner ring 21, the outer ring 22, a plurality of tapered rollers 30, and an annular cage 40. The tapered rollers 30 are disposed between the inner ring 21 and the outer ring 22. The cage 40 retains the plurality of tapered rollers 30.

The inner ring 21 includes, on its outer circumferential surface, an inner raceway surface 23 that expands in diameter from a first side in an axial direction (hereinafter referred to as "the first axial side") toward a second side, which is opposite to the first side, in the axial direction (hereinafter referred to as "the second axial side"). The inner ring 21 includes, on its end portion on the second axial side, a cone back face rib (hereinafter referred to as a "large rib portion") 24 that protrudes outward in a radial direction. The inner ring 21 further includes, on the first axial side, a cone front face rib (hereinafter referred to as a "small rib portion") 25 that protrudes radially outward and a cylindrical end portion 26. The large rib portion 24 and the small rib portion 25 are ring-shaped. An outer circumferential surface of the large rib portion 24 is larger in outside diameter than an outer circumferential surface of the small rib portion 25. The outer circumferential surface of the small rib portion 25 is larger in outside diameter than an outer circumferential surface of the cylindrical end portion 26.

The outer ring 22 includes, on its inner circumferential surface, an outer raceway surface 27 that expands in diameter from the first axial side toward the second axial side. Rotation of the tapered roller bearing 20 configured as described above (according to the first embodiment, rotation of the inner ring 21) produces an action (hereinafter referred to as the "pumping action") that causes fluid to flow from the first axial side toward the second axial side in an annular space 29 provided between the inner ring 21 and the outer ring 22. The pumping action is produced as follows. A centrifugal force developed by rotation of the inner ring 21 and the cage 40 moves the fluid radially outward and further moves the fluid toward the second axial side along the outer raceway surface 27. The pumping action urges lubricating oil on the first axial side of the tapered roller bearing 20 to flow toward the second axial side through the annular space 29. However, the tapered roller bearing 20 according to the first embodiment can produce an action, which is described later, that acts against the flow of lubricating oil produced by the pumping action.

The tapered roller 30 includes a conically shaped outer circumferential surface 31, a roller small end face 32 on the first axial side, and a roller large end face 33 on the second axial side. The roller large end face 33 is a circular face larger in diameter than the roller small end face 32. The roller large end face 33 contacts a side face 24a of the large rib portion 24 of the inner ring 21 to thus position the tapered roller 30 in the axial direction. When the tapered roller bearing 20 rotates (when the inner ring 21 rotates), each of the tapered rollers 30 revolves while rotating and makes a rolling contact with the inner raceway surface 23 and the outer raceway surface 27. When the tapered roller bearing 20 rotates, the roller large end face 33 of each of the tapered rollers 30 makes a sliding contact with the side face 24a of the large rib portion 24.

The cage 40, which is roughly annular, includes a ring-shaped small-diameter annular portion 41, a ring-shaped large-diameter annular portion 42, and a plurality of cage bar portions 43. The small-diameter annular portion 41 is on the first axial side relative to the tapered roller 30. A clearance is provided between the small-diameter annular portion 41 and the roller small end face 32. The large-diameter annular portion 42 is on the second axial side relative to the tapered roller 30 and the outer ring 22. The large-diameter annular portion 42 is on a radially outer side relative to the large rib portion 24. A clearance is provided between a portion (an annular connecting portion 47) of the large-diameter annular portion 42 and the roller large end face 33. A clearance is provided between another portion (a cylindrical portion 45) of the large-diameter annular portion 42 and a second side face 54 of the outer ring 22. The clearances are described later. Each of the cage bar portions 43 connects the small-diameter annular portion 41 and the large-diameter annular portion 42. Spaces between each pair, which is adjacent in a circumferential direction, of the plurality of cage bar portions 43 in an area between the small-diameter annular portion 41 and the large-diameter annular portion 42 are cage pockets 44. The tapered rollers 30 are accommodated in the cage pockets 44. The configuration described above allows the cage 40 to retain the plurality of tapered rollers 30 such that the tapered rollers 30 are spaced from each other in the circumferential direction. The cage 40 according to the first embodiment is made of resin and manufactured by injection molding.

A clearance in the circumferential direction and a clearance in the axial direction are provided between the cage pocket 44 and the tapered roller 30. Accordingly, the cage 40 is displaceable in the axial direction relative to the tapered rollers 30 positioned in the axial direction.

Figure 3:
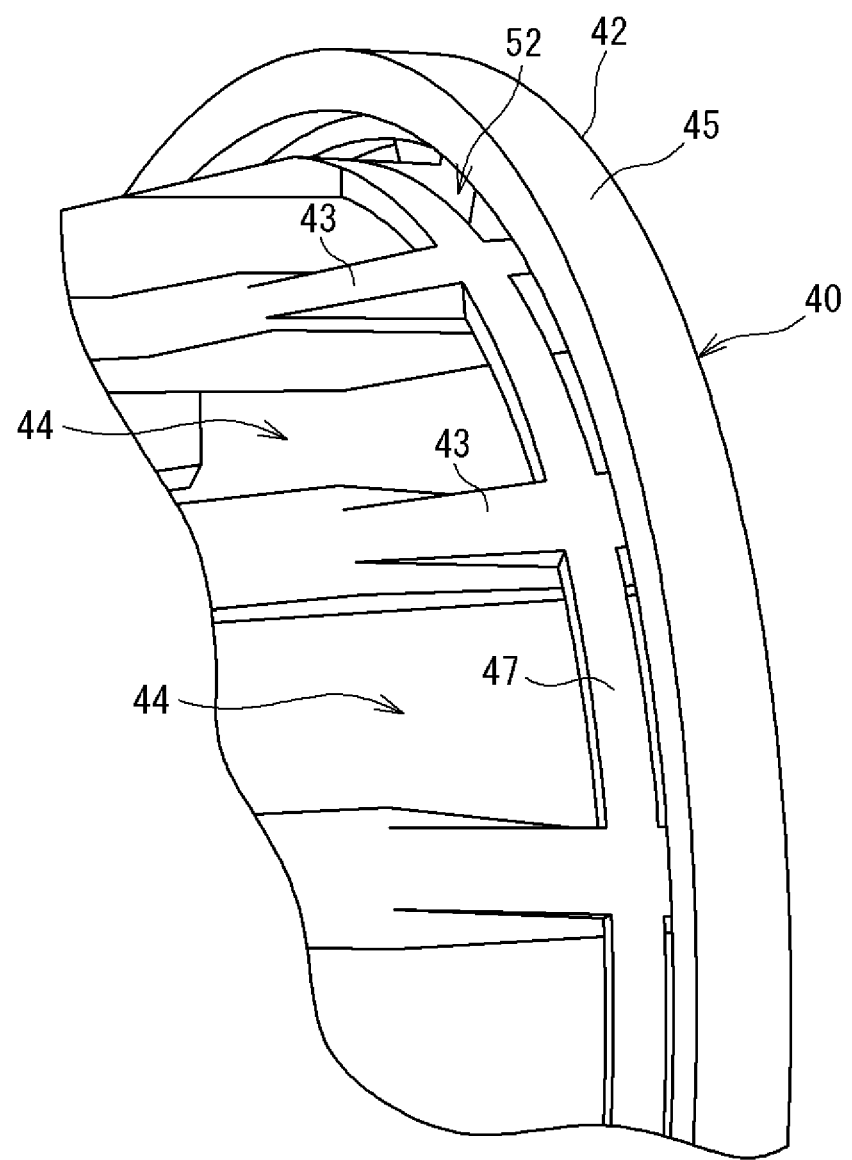
FIG. 3 is a perspective view of a second axial side of a cage according to the first embodiment as viewed from radially outside.
Figure 4:
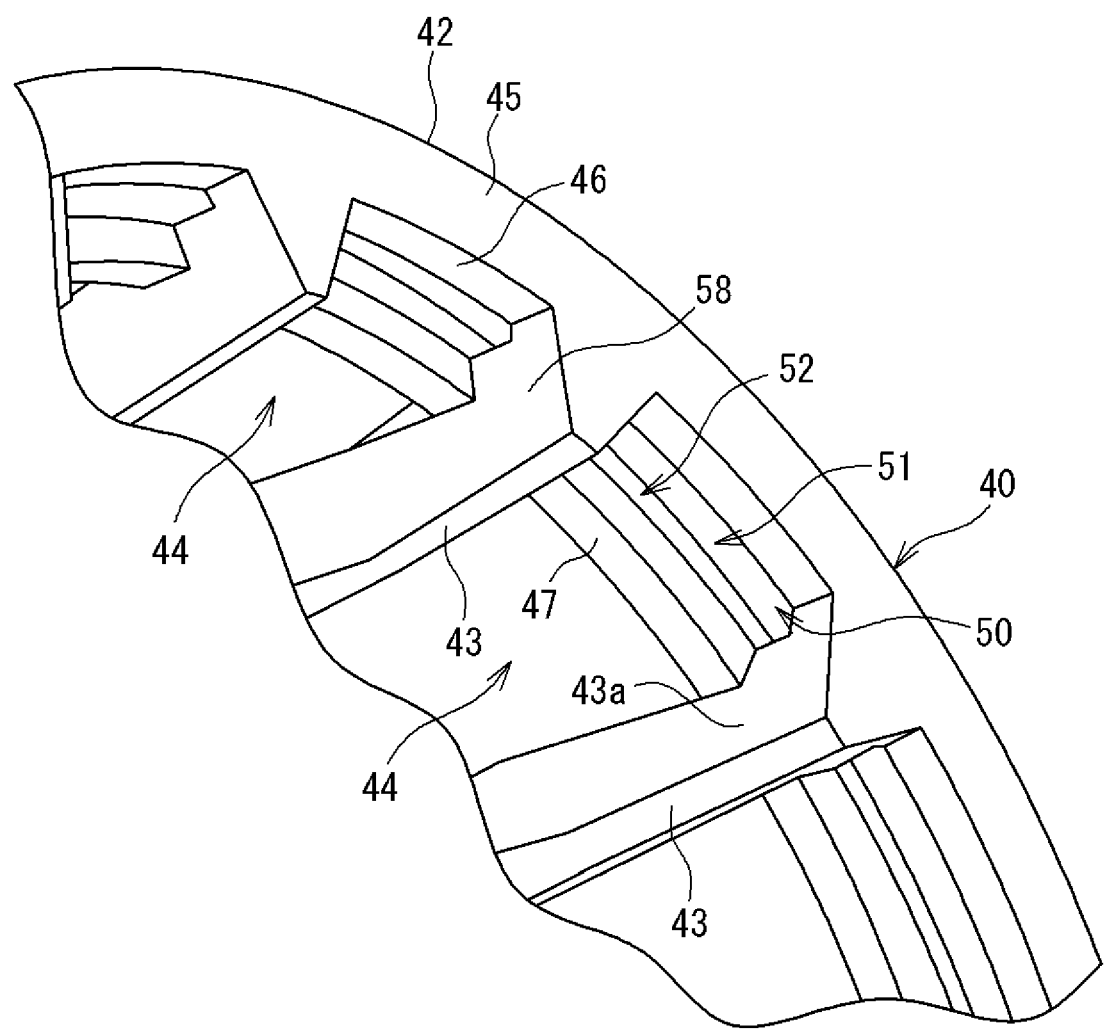
FIG. 4 is a perspective view of the second axial side of the cage as viewed from radially inside.
Figure 5:
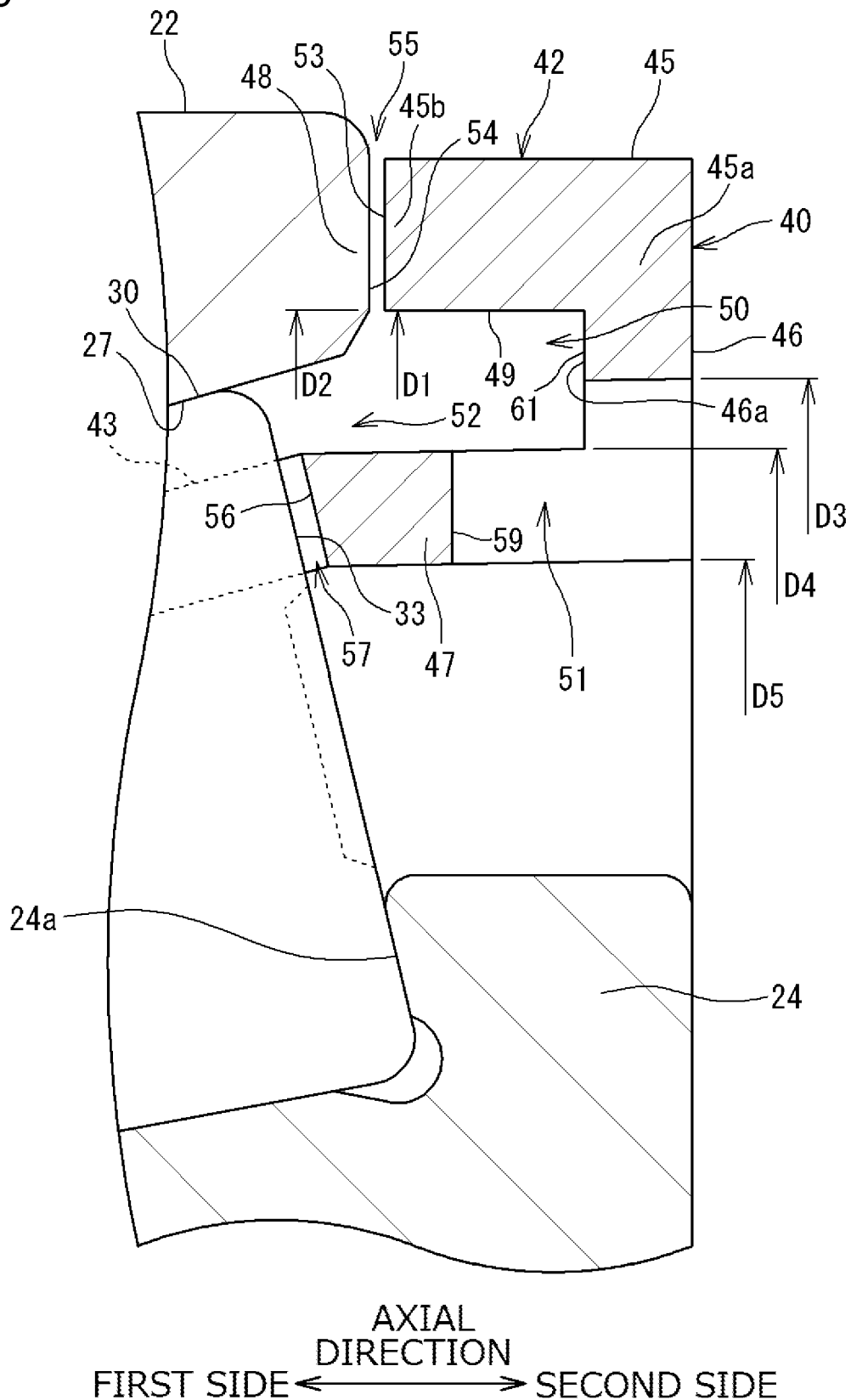
FIG. 5 is an enlarged sectional view illustrating a large-diameter annular portion and its adjacent components according to the first embodiment.

FIG. 3 is a perspective view of the second axial side of the cage 40 as viewed from radially outside. FIG. 4 is a perspective view of the second axial side of the cage 40 as viewed from radially inside. FIG. 5 is an enlarged sectional view illustrating the large-diameter annular portion 42 and its adjacent components. The large-diameter annular portion 42 includes the cylindrical portion 45 and a ring portion 46. The cylindrical portion 45, which is cylindrical, is located next, on the second axial side, to the outer ring 22 as illustrated in FIG. 5. The ring portion 46, which is ring-shaped, extends radially inward from an end portion 45a on the second axial side of the cylindrical portion 45. A space that is radially inward relative to the cylindrical portion 45 and is on the first axial side relative to the ring portion 46 serves as an oil pocket 50.

The oil pocket 50 is open radially inward and toward the first axial side. In the oil pocket 50, an aperture open radially inward is a "first aperture 51", and an aperture open toward the first axial side is a "second aperture 52". Thus, the first aperture 51 that is open radially inward and the second aperture 52 that is open toward the outer raceway surface 27 are provided in the oil pocket 50.

FIG. 5 illustrates a state, in which a central axis of the cage 40 coincides with a central axis of the outer ring 22. A bore diameter D1 of an end portion 45b on the first axial side of the cylindrical portion 45 is set to be equal to or smaller than a bore diameter D2 of an end portion 48 on the second axial side of the outer ring 22 (D1≤D2). The cylindrical portion 45 includes an inner circumferential surface 49 concentric with the central axis of the cage 40. The bore diameter D1 is a bore diameter at an end on the first axial side of the inner circumferential surface 49. The end portion 48 of the outer ring 22 has a chamfered face. The bore diameter D2 is a bore diameter at an end on the second axial side of the chamfered face. The inner circumferential surface 49 of the cylindrical portion 45 is a cylindrical surface concentric with the central axis of the cage 40. Alternatively, the inner circumferential surface 49 may be a tapered surface whose diameter decreases toward any one of the first axial side and the second axial side.

A bore diameter D3 of an end portion 46a on the first axial side of the ring portion 46 is smaller than the bore diameter D2 of the end portion 48 of the outer ring 22. Hence, lubricating oil can be stored in a space surrounded by the ring portion 46, the cylindrical portion 45, and the outer raceway surface 27. The lubricating oil sticks to the roller large end face 33 of the tapered roller 30 and is used for lubrication between the roller large end face 33 and the large rib portion 24. In the embodiment illustrated in FIG. 5, the bore diameter D3 of the end portion 46a is larger than an outside diameter D4 of the annular connecting portion 47; however, the bore diameter D3 may be smaller than the outside diameter D4 and, furthermore, may be smaller than a bore diameter D5 of the annular connecting portion 47. The smaller the bore diameter D3, the larger an amount of lubricating oil that can be stored in the space. An embodiment that increases the capacity of the oil pocket 50 by reducing the bore diameter D3 is described later (see FIG. 7).

As illustrated in FIG. 3 to FIG. 5, according to the first embodiment, the large-diameter annular portion 42 includes the annular connecting portion 47. The annular connecting portion 47, which is ring-shaped, connects second-axial-side portions of the plurality of cage bar portions 43. The annular connecting portion 47 connects the second-axial-side portions of the plurality of cage bar portions 43 to thus increase rigidity of the cage 40. As illustrated in FIG. 5, the ring portion 46 is located on the second axial side relative to the annular connecting portion 47. According to the first embodiment, in which the large-diameter annular portion 42 includes the annular connecting portion 47, a space between the annular connecting portion 47 and the ring portion 46 serves as the first aperture 51. A space between the annular connecting portion 47 and the cylindrical portion 45 serves as the second aperture 52. The space surrounded by the cylindrical portion 45, the ring portion 46, and the annular connecting portion 47 serves as the oil pocket 50.

The annular connecting portion 47 is described below. A side face 56 on the first axial side of the annular connecting portion 47 axially faces the roller large end face 33 of the tapered roller 30. The annular connecting portion 47 is located radially inside relative to the cylindrical portion 45 and (an inner circumferential surface of) the ring portion 46. The side face 56 on the first axial side of the annular connecting portion 47 is located on the first axial side relative to the second side face 54 of the outer ring 22. A side face 59 on the second axial side of the annular connecting portion 47 is located on the second axial side relative to the second side face 54 of the outer ring 22 and a first side face 53 of the cylindrical portion 45 and is located on the first axial side relative to a side face 61 on the first axial side of the ring portion 46. The configuration of the annular connecting portion 47 is not limited to the configuration described above. The annular connecting portion 47 may be omitted.

As illustrated in FIG. 4, the large-diameter annular portion 42 further includes partial connecting portions 58, which are portions extending from the cage bar portions 43. The partial connecting portions 58 connect the annular connecting portion 47 and the ring portion 46. In a configuration, in which the annular connecting portion 47 is omitted, the partial connecting portions 58 connect the cage bar portions 43 and the ring portion 46. The partial connecting portions 58 illustrated in FIG. 4 are (substantially) identical in cross section with end portions 43a on the second axial side of the cage bar portions 43. The partial connecting portions 58 partition the oil pocket 50 into a plurality of sections along the circumferential direction. A radially inner part of each of the partial connecting portions 58 illustrated in FIG. 4 may be omitted. More specifically, although not illustrated, the partial connecting portions 58 may be smaller in cross section than the end portions 43a of the cage bar portions 43.

As described above, the cage 40 is displaceable in the axial direction relative to the tapered rollers 30. When the cage 40 is displaced toward the second axial side (see FIG. 2), the small-diameter annular portion 41 of the cage 40 contacts the roller small end face 32 of the tapered roller 30 to thus limit the displacement. When the cage 40 is displaced toward the opposite, first axial side, the large-diameter annular portion 42 of the cage 40 contacts the outer ring 22, rather than the roller large end face 33 of the tapered roller 30, to thus limit the displacement.

The situation where the cage 40 is displaced toward the second axial side is further described below. Referring to FIG. 5, the first side face 53 on the first axial side of (the cylindrical portion 45 of) the large-diameter annular portion 42 faces the second side face 54 on the second axial side of the outer ring 22 across a micro clearance 55. Even when the cage 40 is displaced toward the second axial side, a dimension of the clearance (the micro clearance 55) between the first side face 53 and the second side face 54 is a micro dimension (e.g., smaller than 0.5 millimeters).

The situation where the cage 40 is displaced toward the first axial side is further described below. A portion (in the first embodiment, the annular connecting portion 47) of the large-diameter annular portion 42 faces the roller large end face 33 of the tapered roller 30. A clearance 57 is provided between the side face 56 on the first axial side of the annular connecting portion 47 and the roller large end face 33. The clearance 57 is larger in the axial direction than the micro clearance 55 in a state (the state illustrated in FIG. 5) where the cage 40 is displaced toward the second axial side (to the right side in FIG. 5). Accordingly, when the cage 40 is displaced toward the first axial side (to the left side in FIG. 5), a portion (in the first embodiment, the annular connecting portion 47) of the large-diameter annular portion 42 contacts the roller large end face 33 of the tapered roller 30. However, prior to this contact, the first side face 53 on the first axial side of (the cylindrical portion 45 of) the large-diameter annular portion 42 contacts the second side face 54 on the second axial side of the outer ring 22. In other words, even when the cage 40 is displaced toward the first axial side, the large-diameter annular portion 42 does not contact the roller large end face 33 of the tapered roller 30. Because the cage 40 of the first embodiment is made of resin, the large-diameter annular portion 42 can make sliding contact with the outer ring 22 smoothly (more smoothly as compared with a configuration in which the cage 40 is made of metal).

A configuration of the first axial side of the tapered roller bearing 20 is described with reference to FIG. 2. As described above, the inner ring 21 includes, on the first axial side, the small rib portion 25 and the cylindrical end portion 26. An inner circumferential end portion 41a of the small-diameter annular portion 41 of the cage 40 is close to the small rib portion 25 and the cylindrical end portion 26. A micro clearance is provided between the inner circumferential end portion 41a and the small rib portion 25 and between the inner circumferential end portion 41a and the cylindrical end portion 26. The micro clearance serves as a labyrinth-shaped clearance 60 defined between the cage 40 and the inner ring 21 on the first axial side. In other words, in the tapered roller bearing 20 according to the first embodiment, the labyrinth-shaped clearance 60 is provided between a portion (the small rib portion 25 and the cylindrical end portion 26) on the first axial side of the inner ring 21 and (the inner circumferential end portion 41a of) the small-diameter annular portion 41. The labyrinth-shaped clearance 60 makes it difficult for lubricating oil on the first axial side relative to the inner ring 21 to enter (the annular space 29 of) the bearing.

Figure 6:
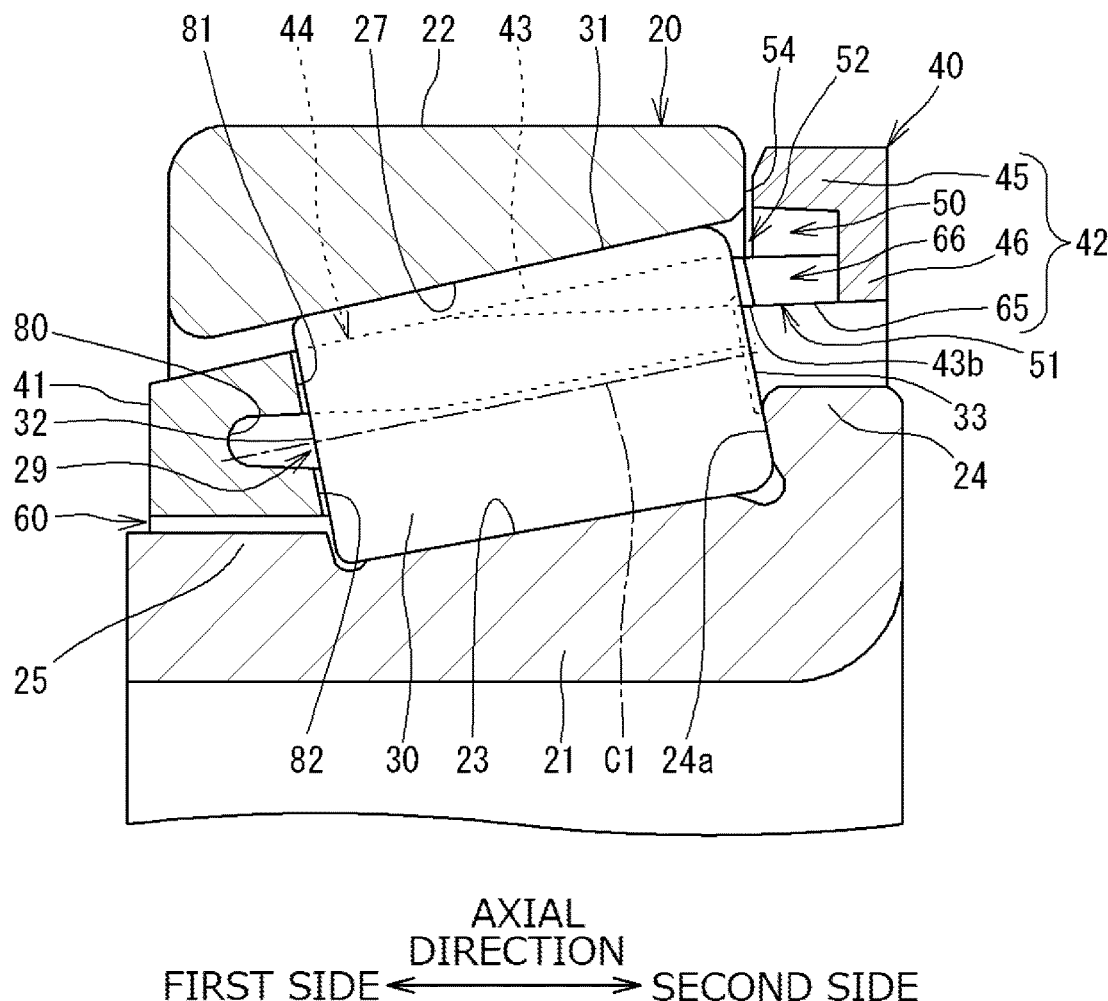
FIG. 6 is a sectional view of the tapered roller bearing according to a second embodiment.

FIG. 6 is a sectional view of the tapered roller bearing 20 according to a second embodiment. The embodiment illustrated in FIG. 1 to FIG. 5 is referred to as the "first embodiment". The embodiment illustrated in FIG. 6 to FIG. 9 is referred to as the "second embodiment". Like symbols (reference numerals) are used to identify elements common to the first and second embodiments where possible, and repeated description is omitted.

Comparison between the first embodiment and the second embodiment indicates that the first embodiment and the second embodiment are identical except for the shape of the first axial side of the inner ring 21 and the shape of the cage 40. The first axial side of the inner ring 21 according to the second embodiment includes the small rib portion 25 but does not include the cylindrical end portion 26, which is included in the inner ring 21 according to the first embodiment. The tapered roller bearing 20 according to the second embodiment does not include the end portion 26 that is smaller in outside diameter than the small rib portion 25. However, a micro clearance is provided between the small-diameter annular portion 41 of the cage 40 and the small rib portion 25 to thus provide the labyrinth-shaped clearance 60.

Figure 7:
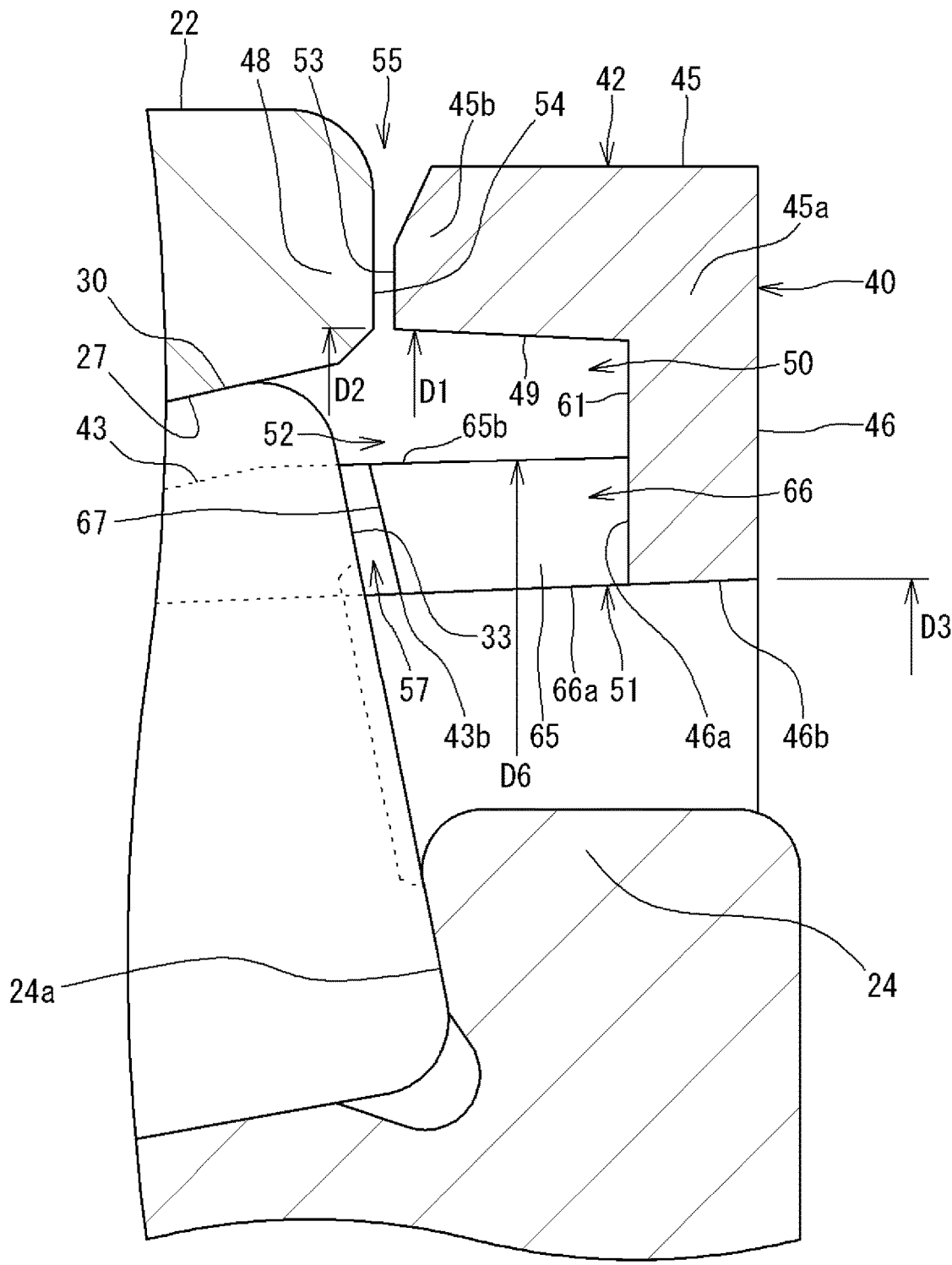
FIG. 7 is an enlarged sectional view illustrating the large-diameter annular portion and its adjacent components according to the second embodiment.
Figure 8:
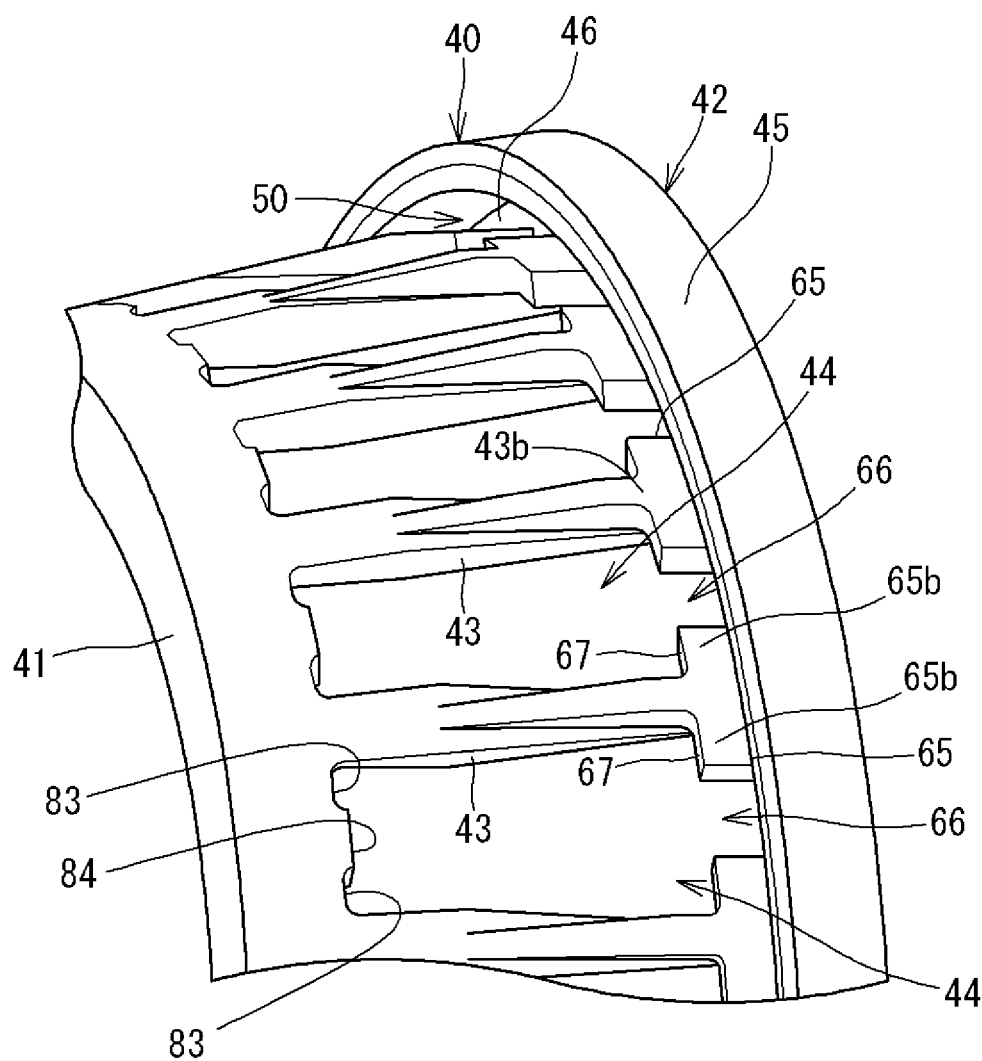
FIG. 8 is a perspective view of the second axial side of the cage according to the second embodiment as viewed from radially outside.
Figure 9:
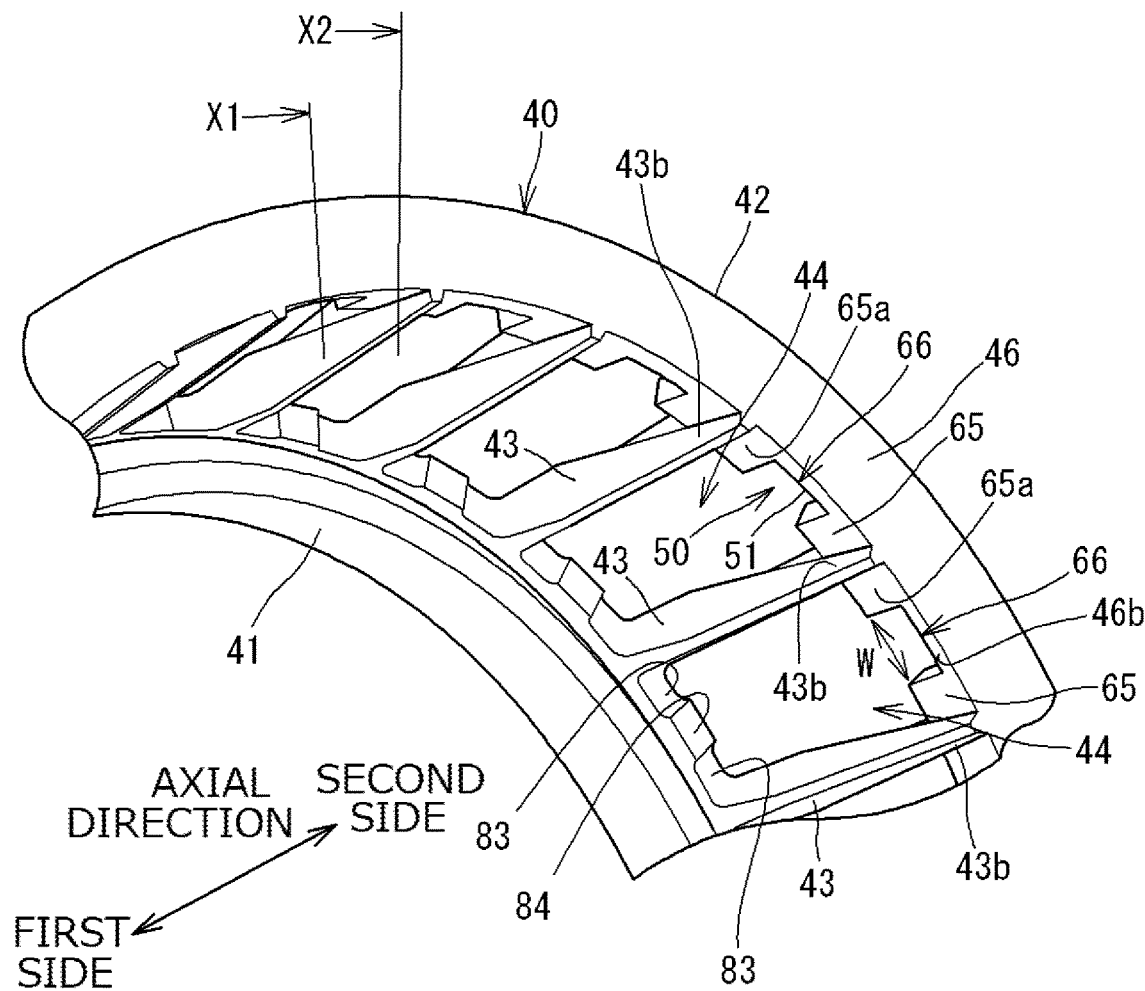
FIG. 9 is a perspective view of the second axial side of the cage as viewed from radially inside.

FIG. 7 is an enlarged sectional view illustrating the large-diameter annular portion 42 of the cage 40 and adjacent components of the large-diameter annular portion 42. FIG. 8 is a perspective view of the second axial side of the cage 40 as viewed from radially outside. FIG. 9 is a perspective view of the second axial side of the cage 40 as viewed from radially inside. The large-diameter annular portion 42 includes the cylindrical portion 45, the ring portion 46, and joint portions 65. The cylindrical portion 45, which is cylindrical, is located next to the outer ring 22 on the second axial side as illustrated in FIG. 7. The ring portion 46, which is ring-shaped, extends radially inward from the end portion 45a on the second axial side of the cylindrical portion 45. The ring portion 46 according to the second embodiment is longer in the radial direction than the ring portion 46 according to the first embodiment (see FIG. 5). The joint portions 65 are located on the second axial side relative to the tapered rollers 30 and radially inward relative to the cylindrical portion 45. The cylindrical portion 45 and the joint portions 65 are spaced from each other. As illustrated in FIG. 9, the joint portions 65 connect portions 43b on the second axial side of the cage bar portions 43 and the ring portion 46. The cage pockets 44 are provided on the first axial side relative to the joint portions 65.

A slit 66 is provided in the joint portion 65. The slit 66 is open toward the cage pocket 44, radially outward (in other words, toward the cylindrical portion 45), and radially inward (in other words, toward the large rib portion 24). As illustrated in FIG. 7, a space provided radially inward relative to the cylindrical portion 45 and on the first axial side relative to the ring portion 46 serves as the oil pocket 50. According to the second embodiment, the slit 66 additionally serves as a part of the oil pocket 50.

The oil pocket 50 is open radially inward and toward the first axial side. In the oil pocket 50, an aperture open radially inward is the "first aperture 51", and an aperture open toward the first axial side is the "second aperture 52". A radially inner end 66a of the slit 66 serves as the first aperture 51 of the oil pocket 50. An end on the first axial side of a space between the joint portion 65 and the cylindrical portion 45 serves as the second aperture 52 of the oil pocket 50. Thus, the first aperture 51 that is open radially inward and the second aperture 52 that is open toward the outer raceway surface 27 on the first axial side are provided in the oil pocket 50.

The joint portions 65 are further described. As illustrated in FIG. 8 and FIG. 9, the joint portion 65 is provided for each of the cage pockets 44. A radially inner side face 65a (see FIG. 9) and a radially outer side face 65b (see FIG. 8) of the joint portion 65 are each shaped along any one of an imaginary cylindrical surface and an imaginary tapered surface concentric with the central axis of the cage 40. The radially inner side face 65a is continuous with an inner circumferential surface 46b of the ring portion 46. The radially inner side face 65a and the inner circumferential surface 46b are formed along any one of the cylindrical surface and the tapered surface described above. The slit 66 is provided in each of the joint portions 65 at a center in the circumferential direction on the side of the cage pocket 44. A side face 67 (see FIG. 7) on the first axial side of the joint portion 65 axially faces the roller large end face 33 of the tapered roller 30.

As illustrated in FIG. 7, the bore diameter D3 of the end portion 46a on the first axial side of the ring portion 46 is smaller than the bore diameter D2 of the end portion 48 of the outer ring 22. Hence, lubricating oil can be stored in a space surrounded by the ring portion 46, the cylindrical portion 45, and the outer raceway surface 27. The lubricating oil sticks to the roller large end face 33 of the tapered roller 30 and is used for lubrication between the roller large end face 33 and the large rib portion 24. The bore diameter D3 of the end portion 46a is smaller than an outside diameter D6 of the joint portion 65 (D3<D6). In other words, the inner circumferential surface 46b of the ring portion 46 is located radially inside relative to the radially outer side faces 65b of the joint portions 65. As the bore diameter D3 decreases, a dimension in the radial direction of the oil pocket 50 increases (in other words, a depth in the radial direction of the oil pocket 50 increases), and the amount of lubricating oil that can be stored increases.

As described above, the cage 40 is displaceable in the axial direction relative to the tapered rollers 30. When the cage 40 is displaced toward the second axial side (see FIG. 2), the small-diameter annular portion 41 of the cage 40 contacts the roller small end face 32 of the tapered roller 30 to thus limit the displacement. In contrast, when the cage 40 is displaced toward the first axial side, the large-diameter annular portion 42 of the cage 40 contacts the outer ring 22, rather than the roller large end face 33 of the tapered roller 30, to thus limit the displacement.

The situation where the cage 40 is displaced toward the first axial side is further described below. As illustrated in FIG. 7, a portion (in the second embodiment, the joint portion 65) of the large-diameter annular portion 42 faces the roller large end face 33 of the tapered roller 30. The clearance 57 is provided between the side face 67 on the first axial side of the joint portion 65 and the roller large end face 33. The clearance 57 is larger in the axial direction than the micro clearance 55 between the outer ring 22 and the cylindrical portion 45 in a state (the state illustrated in FIG. 7) where the cage 40 is displaced toward the second axial side (to the right side in FIG. 7). Accordingly, when the cage 40 is displaced toward the first axial side (to the left side in FIG. 7), a portion (in the second embodiment, the joint portion 65) of the large-diameter annular portion 42 contacts the roller large end face 33 of the tapered roller 30. However, prior to this contact, the first side face 53 on the first axial side of (the cylindrical portion 45 of) the large-diameter annular portion 42 contacts the second side face 54 on the second axial side of the outer ring 22. In other words, even when the cage 40 is displaced toward the first axial side, the large-diameter annular portion 42 does not contact the roller large end face 33 of the tapered roller 30.

The cage 40 is made of thermoplastic resin. The cage 40 is manufactured by injection molding using two split molds, which are parts separable in the axial direction. This holds true for both the first embodiment and the second embodiment.

Figure 10:
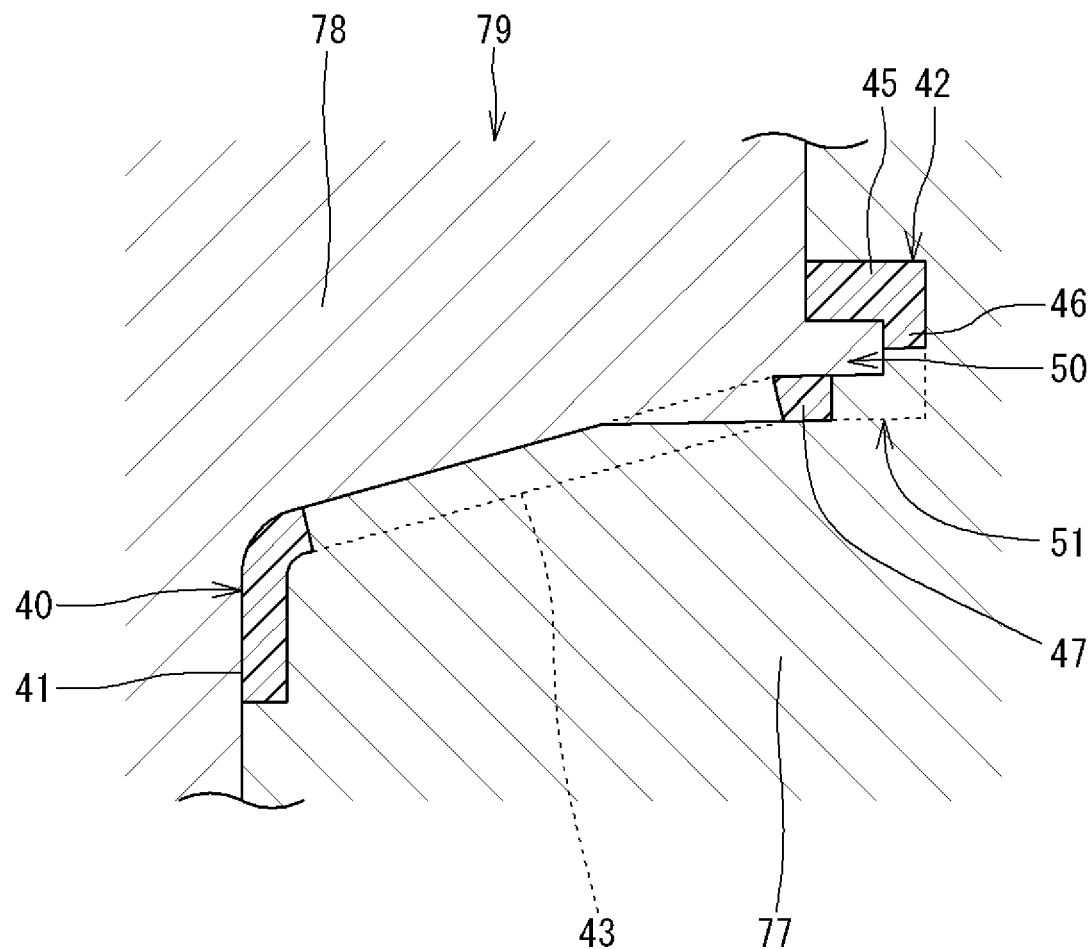
FIG. 10 is an explanatory drawing of a mold for molding the cage according to the first embodiment.

FIG. 10 is an explanatory drawing of a mold 79 for molding the cage 40 according to the first embodiment. The mold 79 includes a first split mold 78 and a second split mold 77 as the two split molds. The large-diameter annular portion 42 can be molded in a portion of a cavity between the first split mold 78 and the second split mold 77. After molding, the first split mold 78 and the second split mold 77 are separable in the axial direction. The first split mold 78 and the second split mold 77 are moved and separated in the axial direction, so that the cage 40, which is a molded product, is released.

Figure 11:
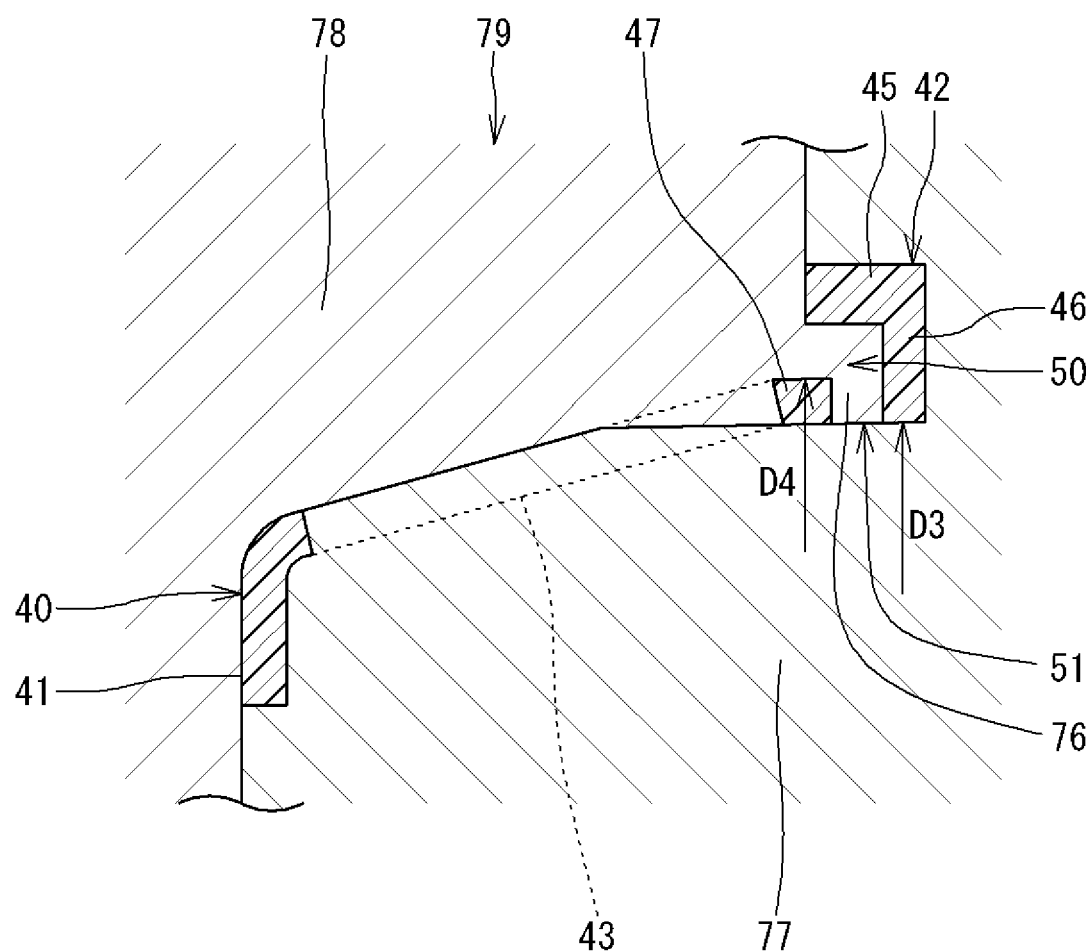
FIG. 11 is an explanatory drawing of the mold for molding a modification of the cage according to the first embodiment.

FIG. 11 is an explanatory drawing of the mold 79 for molding a modification of the cage 40 according to the first embodiment. According to the modification, the bore diameter D3 of the ring portion 46 of the large-diameter annular portion 42 is smaller than the outside diameter D4 of the annular connecting portion 47 (D3<D4). For the modification, in contrast to the first embodiment illustrated in FIG. 10, the split molds (77 and 78), which are two parts separable in the axial direction, cannot be employed. More specifically, the modification illustrated in FIG. 11 requires a mold portion 76 between the ring portion 46 and the annular connecting portion 47 to provide the first aperture 51 in the oil pocket 50. However, one (the first split mold 78) of the split molds that includes the mold portion 76 is unmovable in the axial direction after injection molding. Accordingly, for the modification, the split molds (77 and 78), which are two parts separable in the axial direction, cannot be employed, and a third split mold, which is not illustrated, movable in the radial direction is additionally required.

Figure 12:
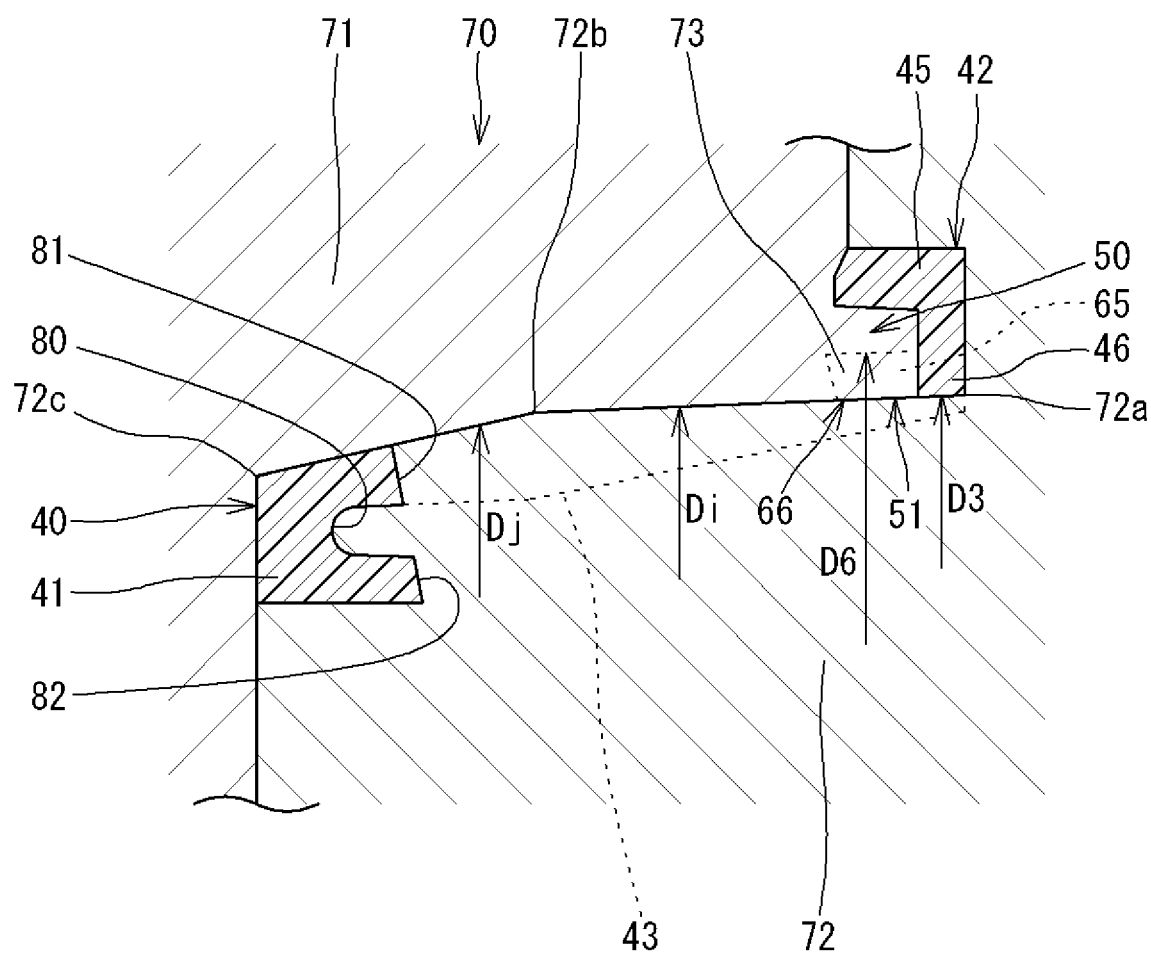
FIG. 12 is an explanatory drawing of a mold for molding the cage according to the second embodiment.
Figure 13:
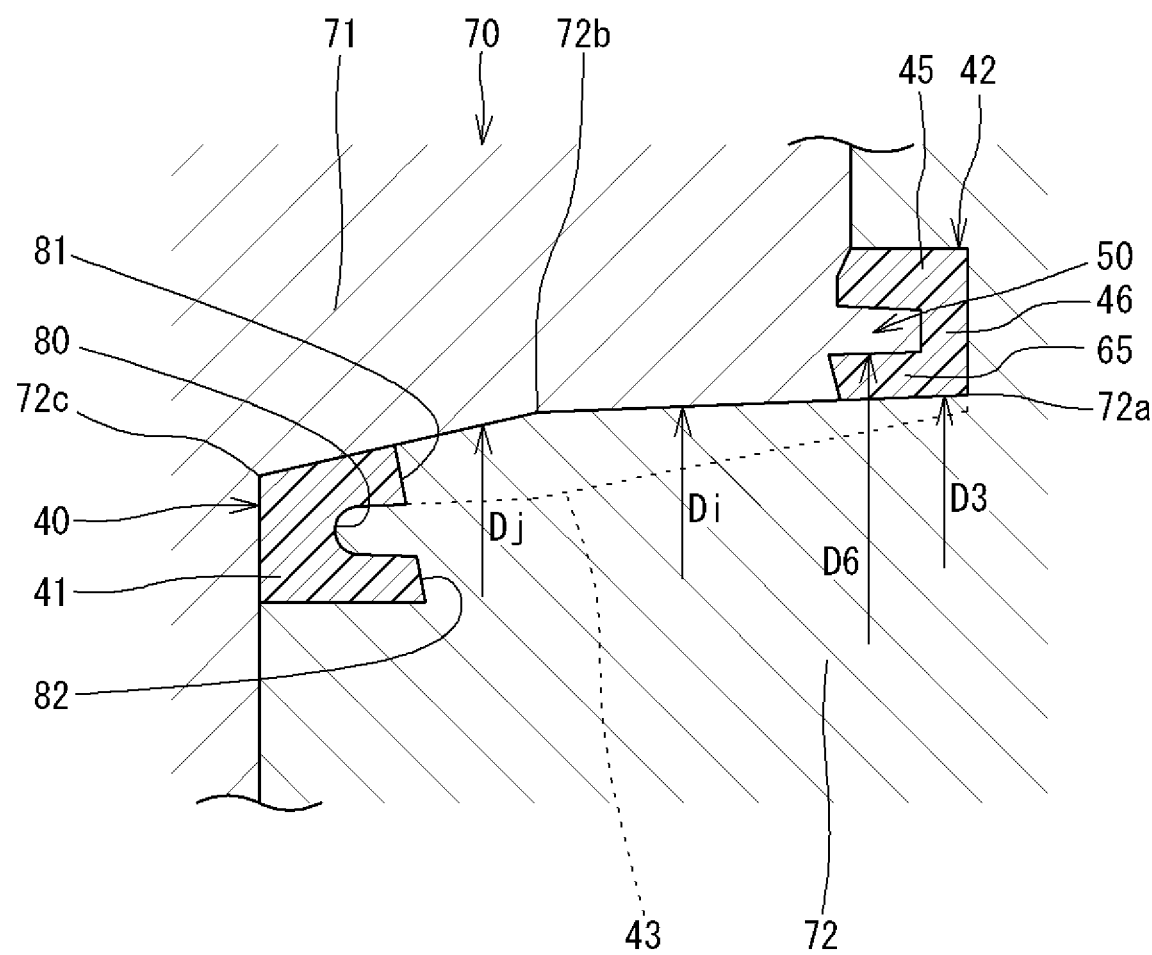
FIG. 13 is an explanatory drawing of the mold for molding the cage according to the second embodiment.
Figure 14:
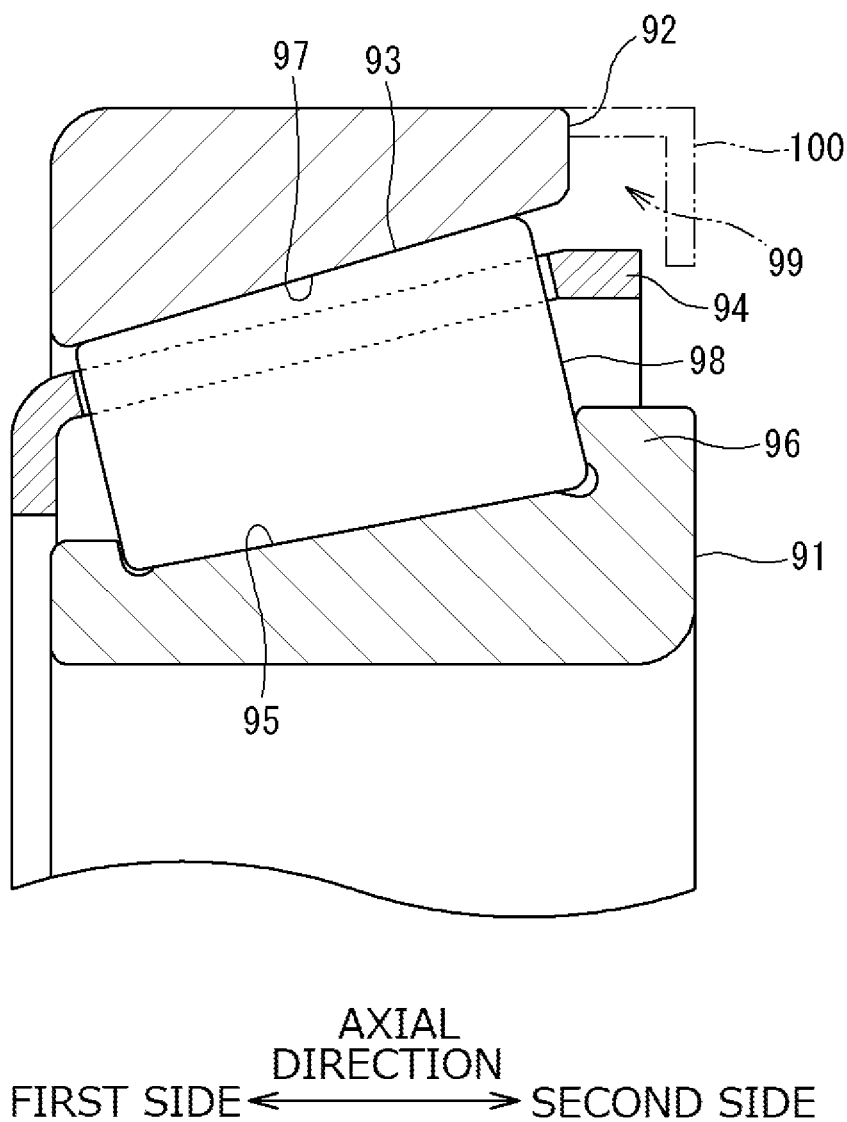
FIG. 14 is a sectional view of a tapered roller bearing of a related art.

FIG. 12 and FIG. 13 are explanatory drawings of a mold 70 for molding the cage 40 according to the second embodiment. FIG. 12 is a sectional view of the mold 70 taken in the axial direction through the slit 66 along an arrow X1 of FIG. 9. FIG. 13 is a sectional view of the mold 70 taken in the axial direction through the joint portion 65 and the cage pocket 44 along an arrow X2 of FIG. 9. The mold 70 includes a first split mold 71 and a second split mold 72 as the two split molds. According to the second embodiment, the bore diameter D3 of the ring portion 46 of the large-diameter annular portion 42 is smaller than the outside diameter D6 of the joint portion 65 (D3<D6). Comparison between the second embodiment and the modification indicates that, according to the second embodiment, the slit 66 is provided in the joint portion 65 as illustrated in FIG. 9. The slit 66 is open toward the first axial side. The slit 66 provides the first aperture 51 in the oil pocket 50. Referring to FIG. 12, a mold portion 73 for providing the slit 66 is a part of the first split mold 71. The first split mold 71 is movable toward the first axial side. Accordingly, according to the second embodiment, the large-diameter annular portion 42 can be molded in a portion of a cavity between the first split mold 71 and the second split mold 72. After molding, the first split mold 71 and the second split mold 72 are separable in the axial direction. In other words, for the second embodiment, the split molds (71 and 72), which are two parts separable in the axial direction, can be employed. In contrast to the modification, the second embodiment does not require the third split mold movable in the radial direction.

A shape of the second split mold 72 is further described. The second split mold 72 is shaped along an imaginary tapered surface having an outside diameter Di that decreases toward the first axial side in an area between a first position 72a, which corresponds to an inner circumferential end portion on the second axial side of the large-diameter annular portion 42, and a second position 72b, which corresponds to a center in the axial direction of a radially outer side face of the cage bar portion 43. Furthermore, the second split mold 72 is shaped along an imaginary tapered surface having an outside diameter Dj that decreases toward the first axial side in an area between the second position 72b and a third position 72c, which corresponds to an outer circumferential end portion on the first axial side of the small-diameter annular portion 41. This configuration facilitates an operation of moving the first split mold 71 and the second split mold 72 in the axial direction for product release.

According to the second embodiment (see FIG. 9), a circumferential width dimension W of the slit 66 provided in the joint portion 65 is uniform in the axial direction or increases toward the first axial side. This configuration (see FIG. 12) facilitates moving the mold portion 73 for providing the slit 66 of the first split mold 71 toward the first axial side for product release.

In the tapered roller bearing 20 (see FIG. 2 and FIG. 6) of each of the embodiments (each of the first embodiment and the second embodiment), the large-diameter annular portion 42 has the oil pocket 50 for storing lubricating oil. The first aperture 51 that is open radially inward and the second aperture 52 that is open toward the outer raceway surface 27 are provided in the oil pocket 50. According to the tapered roller bearing 20, when the inner ring 21 rotates, lubricating oil around the large rib portion 24 of the inner ring 21 is moved by a centrifugal force toward the large-diameter annular portion 42 of the cage 40. The lubricating oil moved as described above can enter the oil pocket 50 through the first aperture 51 and flow toward the outer raceway surface 27 through the second aperture 52. The lubricating oil flowed to the outer raceway surface 27 is moved to the inner ring 21 by rotation of the tapered roller 30 and supplied to a space between the large rib portion 24 of the inner ring 21 and the roller large end face 33 of the tapered roller 30. Consequently, sliding resistance between the roller large end face 33 and the large rib portion 24 can be reduced. Hence, reduction of occurrence of seizure at a sliding contact portion between the roller large end face 33 and the large rib portion 24 can be achieved.

The lubricating oil around the large rib portion 24 of the inner ring 21 is moved radially outward by the centrifugal force to enter and be stored in the oil pocket 50. The higher a rotation speed of the inner ring 21, the larger the centrifugal force and the higher a pressure on the lubricating oil stored in the oil pocket 50. Meanwhile, the centrifugal force developed by rotation of the cage 40 also causes lubricating oil in a space, which is a part of the annular space 29, between the cage 40 and the outer ring 22 to flow along the outer raceway surface 27 toward the second axial side or, in other words, toward the oil pocket 50. This produces the pumping action described above. However, the cage 40 rotates at a speed approximately one-half of the rotation speed of the inner ring 21. Therefore, the pressure on the lubricating oil flowing toward the oil pocket 50 along the outer raceway surface 27 is lower than the pressure on the lubricating oil entered and stored in the oil pocket 50 from the large rib portion 24 of the inner ring 21. This allows the lubricating oil in the oil pocket 50 to flow toward the outer raceway surface 27 through the second aperture 52. Hence, an action that causes the lubricating oil to flow toward the first axial side is produced. In other words, in the tapered roller bearing 20 according to any one of the first embodiment and the second embodiment, the action acting against the flow of lubricating oil produced by the pumping action is produced, and the lubricating oil in the oil pocket 50 is pressurized to be delivered toward the first axial side.

The tapered roller bearings 20 configured as described above are disposed in the gear mechanism 5 illustrated in FIG. 1. Lubricating oil is stored in the overall housing 11. The lubricating oil is used for lubrication of, for example, the tapered roller bearings 20 and gears in the case 6. When the pumping action, which is produced by rotation of the tapered roller bearing 20, that urges fluid (the lubricating oil) to flow from the first axial side toward the second axial side is too strong, shortage of the lubricating oil may occur on the first axial side. In the tapered roller bearing 20 on the left side in FIG. 1, the pumping action causes the lubricating oil in a space K1 on the left of the tapered roller bearing 20 to flow to the right. Consequently, an amount of the lubricating oil in the space K1 decreases and an amount of the lubricating oil entering the case 6 decreases, which may result in the shortage of the lubricating oil in the case 6. However, as described above, the tapered roller bearing 20 according to each of the embodiments produces the action acting against the flow of lubricating oil produced by the pumping action. The action can reduce a flow of the lubricating oil from the space K1 on the first axial side toward the second axial side through the annular space 29. As a result, the shortage of the lubricating oil in the space K1 can be reduced. Thus, a sufficient amount of the lubricating oil in the space K1 can enter the case 6 to be used for lubrication of, for example, gears.

Furthermore, in each of the embodiments (see FIG. 2 and FIG. 6), the labyrinth-shaped clearance 60 is provided between a portion (in FIG. 2, the small rib portion 25 and the cylindrical end portion 26) on the first axial side of the inner ring 21 and the small-diameter annular portion 41 of the cage 40. Accordingly, a flow of lubricating oil from the first axial side of the inner ring 21 toward the second axial side through the annular space 29 can be reduced. As described above, the lubricating oil in the oil pocket 50 flows toward the outer raceway surface 27 through the second aperture 52. This produces an action urging the lubricating oil to flow toward the first axial side, which acts against the pumping action described above. Consequently, the shortage of the lubricating oil on the first axial side can be further effectively reduced.

In the tapered roller bearing 20 according to each of the embodiments, the large-diameter annular portion 42 of the cage 40 extends not only to a position facing the tapered roller 30 but also to a position facing the second axial side of the outer ring 22. The oil pocket 50 provided in the large-diameter annular portion 42 is open toward the outer raceway surface 27. Accordingly, even when lubricating oil is caused to flow (by the pumping action described above) from the first axial side toward the second axial side along the outer raceway surface 27, the oil pocket 50 can receive the lubricating oil through the second aperture 52. Furthermore, even when lubricating oil flows from the first axial side toward the second axial side along a radially inner side face of the cage bar portion 43 of the cage 40, the oil pocket 50 can receive the lubricating oil through the first aperture 51.

The tapered roller bearing 20 according to each of the embodiments is configured to make it difficult for lubricating oil stored in the oil pocket 50 to be discharged from the space between the large-diameter annular portion 42 and the outer ring 22. More specifically, referring to FIG. 5 (FIG. 7), the micro clearance 55 is provided between the first side face 53 on the first axial side of the large-diameter annular portion 42 and the second side face 54 on the second axial side of the outer ring 22. The micro clearance 55 functions as the labyrinth-shaped clearance. This configuration can reduce discharge of the lubricating oil in the oil pocket 50 from the space between the large-diameter annular portion 42 and the outer ring 22 to thus maintain the pressure on the lubricating oil in the oil pocket 50 high. The lubricating oil under the high pressure in the oil pocket 50 is more likely to flow from the oil pocket 50 toward the inner circumferential surface side of the outer ring 22, where the pressure on the lubricating oil is lower.

As described above with reference to FIG. 5, the bore diameter D1 of the end portion 45b on the first axial side of the cylindrical portion 45 of the large-diameter annular portion 42 is equal to or smaller than the bore diameter D2 of the end portion 48 on the second axial side of the outer ring 22. This configuration makes the lubricating oil more likely to flow from the oil pocket 50 toward the inner circumferential surface side of the outer ring 22. Accordingly, the lubricating oil is more likely to be supplied to the outer raceway surface 27 and the tapered roller 30 through the second aperture 52. The same applies to the second embodiment illustrated in FIG. 7.

In the tapered roller bearing 20 of each of the embodiments, when the cage 40 is displaced toward the first axial side, a portion (the annular connecting portion 47 in FIG. 2 or the joint portion 65 in FIG. 6) of the large-diameter annular portion 42 contacts the roller large end face 33 of the tapered roller 30. However, prior to this contact, the first side face 53 on the first axial side of the large-diameter annular portion 42 contacts the second side face 54 on the second axial side of the outer ring 22. This reduces lubricating oil sticking to the roller large end face 33 of the tapered roller 30 being scraped off by a portion (the annular connecting portion 47 or the joint portion 65) of the large-diameter annular portion 42. Consequently, the lubricating oil sticking to the roller large end face 33 is used for lubrication between the roller large end face 33 and the large rib portion 24 of the inner ring 21.

The second embodiment illustrated in FIG. 6 to FIG. 9 is described. The large-diameter annular portion 42 included in the cage 40 includes the cylindrical portion 45, the ring portion 46, and the joint portions 65 that connect the portions 43b on the second axial side of the cage bar portions 43 and the ring portion 46. The joint portions 65 are located on the second axial side relative to the tapered rollers 30 and radially inward relative to the cylindrical portion 45. The slit 66 that is open toward the cage pocket 44, radially outward, and radially inward is provided in each of the joint portions 65. According to the second embodiment, the radially inner end 66a of the slit 66 provided in the joint portion 65 serves as the first aperture 51. The spaces between the joint portions 65 and the cylindrical portion 45 serve as the oil pocket 50. The capacity of the oil pocket 50 is increased by the slits 66, which are additionally included in the oil pocket 50. The end on the first axial side of the space between the joint portion 65 and the cylindrical portion 45 serves as the second aperture 52.

According to the second embodiment (see FIG. 7), the inner circumferential surface 46b of the ring portion 46 is located radially inside relative to the radially outer side faces 65b of the joint portions 65 (hence, D3<D6 holds). This configuration increases a radial dimension of the ring portion 46 and hence increases the capacity of the oil pocket 50. Although D3<D6 holds, the slit 66 that is open to the axial first side is provided in the joint portion 65. Accordingly, as described above (see FIG. 12 and FIG. 13), the cage 40 can be molded using the split molds (71 and 72), which are two parts separable in the axial direction.

Referring to FIG. 6, a recess 80 is provided in a side face on the side of the tapered roller 30 (the second axial side) of the small-diameter annular portion 41. The recess 80 faces the roller small end face 32 of the tapered roller 30 and is open toward the roller small end face 32. The recess 80 reduces rigidity of the small-diameter annular portion 41. Side faces (an outer facing face 81 and an inner facing face 82) on the second axial side of the small-diameter annular portion 41 face the roller small end face 32 of the tapered roller 30. The outer facing face 81 located radially outside relative to the recess 80 is disposed parallel to the roller small end face 32 of the tapered roller 30. The outer facing face 81 faces the roller small end face 32 at a position radially outside relative to the central axis C1 of the tapered roller 30. The inner facing face 82 located radially inside relative to the recess 80 is also disposed parallel to the roller small end face 32. The inner facing face 82 faces the roller small end face 32 at a position radially inside relative to the central axis C1 of the tapered roller 30. The outer facing face 81 is spaced away from the roller small end face 32 by a first clearance. The inner facing face 82 is spaced away from the roller small end face 32 by a second clearance. The first clearance is set to be smaller than the second clearance. In other words, the inner facing face 82 is located more distant from the roller small end face 32 than the outer facing face 81 is. This configuration is useful mainly for assembling the tapered roller bearing 20. The configuration of the small-diameter annular portion 41 illustrated in FIG. 6 may be applied to the first embodiment (FIG. 2).

Referring to FIG. 8, recesses 83 extending in the radial direction are provided in a side face (which faces the roller small end face 32 of the tapered roller 30) on the second axial side of the small-diameter annular portion 41. The recesses 83 are provided on both sides in the circumferential direction of a center projection 84. The recesses 83 face the roller small end face 32 of the tapered roller 30. The projection 84 can contact the roller small end face 32. The recesses 83 provide a clearance between the small-diameter annular portion 41 and the roller small end face 32 of the tapered roller 30. Accordingly, when the pumping action described above is produced, the recesses 83 serve as channels (guiding paths), through which lubricating oil is caused to flow by the pumping action from radially inside to radially outside. The configuration (the recesses 83) of the small-diameter annular portion 41 illustrated in FIG. 8 may be applied to the first embodiment (FIG. 2).

The disclosed embodiments are in every aspect illustrative and not restrictive. It should be understood that the scope of the invention is not limited to the embodiments described above and encompasses all modifications within the scope of the appended claims and equivalents thereof. For example, the small-diameter annular portion 41 of the cage 40 may be of a shape other than the illustrated shape.

A tapered roller bearing of the invention allows supplying lubricating oil to a space between a roller large end face of a tapered roller bearing and a cone back face rib portion, which leads to reduction of sliding resistance between the roller large end face and the cone back face rib portion and reduction of occurrence of seizure.

What is claimed is:

1. A tapered roller bearing comprising:
   an inner ring including, on an outer circumferential surface, an inner raceway surface that expands in diameter from a first side in an axial direction toward a second side, which is opposite to the first side, in the axial direction and including, on an end portion on the second side in the axial direction of the inner ring, a cone back face rib portion protruding outward in a radial direction;
   an outer ring including, on an inner circumferential surface, an outer raceway surface that expands in diameter from the first side in the axial direction toward the second side in the axial direction;
   a plurality of tapered rollers disposed between the inner ring and the outer ring; and
   an annular cage that retains the plurality of tapered rollers such that the tapered rollers are spaced from each other in a circumferential direction, wherein:
   the cage includes a small-diameter annular portion located on the first side relative to the tapered roller in the axial direction, a large-diameter annular portion located on the second side relative to the tapered roller and the outer ring in the axial direction, and a plurality of cage bar portions that connects the small-diameter annular portion and the large-diameter annular portion, spaces between each circumferentially-adjacent pair of cage bar portions in an area between the small-diameter annular portion and the large-diameter annular portion are cage pockets for accommodating the tapered rollers, the large-diameter annular portion has an oil pocket having a first aperture that is open radially inward and a second aperture that is open toward the outer raceway surface, and when the cage is displaced toward the first side in the axial direction, a first side face on the first side in the axial direction of the large-diameter annular portion contacts a second side face on the second side in the axial direction of the outer ring before a portion of the large-diameter annular portion contacts a roller large end face of the tapered roller.

2. The tapered roller bearing according to claim 1, wherein the first side face on the first side in the axial direction of the large-diameter annular portion faces the second side face on the second side in the axial direction of the outer ring, a clearance being between the first side face and the second side face.

3. The tapered roller bearing according to claim 1, wherein a clearance is provided between a portion on the first side in the axial direction of the inner ring and the small-diameter annular portion.

4. The tapered roller bearing according to claim 1, wherein:
the large-diameter annular portion includes;
a cylindrical portion located next to the outer ring on the second side in the axial direction and
a ring portion extending radially inward from an end portion on the second side in the axial direction of the cylindrical portion, and
the oil pocket is a space provided radially inward relative to the cylindrical portion and on the first side in the axial direction relative to the ring portion.

5. The tapered roller bearing according to claim 4, wherein a bore diameter of an end portion on the first side in the axial direction of the cylindrical portion is equal to or smaller than a bore diameter of an end portion on the second side in the axial direction of the outer ring.

6. The tapered roller bearing according to claim 4, wherein:
the large-diameter annular portion further includes an annular connecting portion that connects portions on the second side in the axial direction of the plurality of cage bar portions, and
the ring portion is located on the second side relative to the annular connecting portion in the axial direction.

7. The tapered roller bearing according to claim 1, wherein:
the large-diameter annular portion includes:
a cylindrical portion located next to the outer ring on the second side in the axial direction,
a ring portion extending radially inward from an end portion on the second side in the axial direction of the cylindrical portion, and
joint portions, the joint portions (i) being located next to the tapered rollers on the second side in the axial direction and radially inward relative to the cylindrical portion, and (ii) connecting portions of the cage bar portions on the second side in the axial direction to the ring portion, and slits are provided in the joint portions and function as the first aperture, the slits being (i) open toward the cage pockets, (ii) open radially outward, and (iii) open radially inward.

8. The tapered roller bearing according to claim 7, wherein an inner circumferential surface of the ring portion is located radially inside relative to radially outer side faces of the joint portions.

9. A tapered roller bearing comprising:
an inner ring including, on an outer circumferential surface, an inner raceway surface that expands in diameter from a first side in an axial direction toward a second side, which is opposite to the first side, in the axial direction and including, on an end portion on the second side in the axial direction of the inner ring, a cone back face rib portion protruding outward in a radial direction;
an outer ring including, on an inner circumferential surface, an outer raceway surface that expands in diameter from the first side in the axial direction toward the second side in the axial direction;
a plurality of tapered rollers disposed between the inner ring and the outer ring; and
an annular cage that retains the plurality of tapered rollers such that the tapered rollers are spaced from each other in a circumferential direction, wherein:
the cage includes a small-diameter annular portion located on the first side relative to the tapered roller in the axial direction, a large-diameter annular portion located on the second side relative to the tapered roller and the outer ring in the axial direction, and a plurality of cage bar portions that connects the small-diameter annular portion and the large-diameter annular portion,
spaces between each circumferentially-adjacent pair of cage bar portions in an area between the small-diameter annular portion and the large-diameter annular portion are cage pockets for accommodating the tapered rollers,
the large-diameter annular portion has an oil pocket having a first aperture that is open radially inward and a second aperture that is open toward the outer raceway surface,
the large-diameter annular portion includes:
a cylindrical portion located next to the outer ring on the second side in the axial direction,
a ring portion extending radially inward from an end portion on the second side in the axial direction of the cylindrical portion, and
joint portions, the joint portions (i) being located next to the tapered rollers on the second side in the axial direction and radially inward relative to the cylindrical portion, and (ii) connecting portions of the cage bar portions on the second side in the axial direction to the ring portion, and
slits are provided in the joint portions and function as the first aperture, the slits being (i) open toward the cage pockets, (ii) open radially outward, and (iii) open radially inward.

10. The tapered roller bearing according to claim 9, wherein an inner circumferential surface of the ring portion is located radially inside relative to radially outer side faces of the joint portions.

* * * * *